United States Patent
Ohtake et al.

(10) Patent No.: US 11,004,243 B2
(45) Date of Patent: May 11, 2021

(54) CT RECONSTRUCTION METHOD USING FILTERED BACK PROJECTION

(71) Applicants: THE UNIVERSITY OF TOKYO, Tokyo (JP); MITUTOYO CORPORATION, Kanagawa (JP)

(72) Inventors: Yutaka Ohtake, Tokyo (JP); Tomonori Goto, Kanagawa (JP); Masato Kon, Kanagawa (JP)

(73) Assignees: THE UNIVERSITY OF TOKYO, Tokyo (JP); MITUTOYO CORPORATION, Kanagawa (JP)

( * ) Notice: Subject to any disclaimer, the term of this patent is extended or adjusted under 35 U.S.C. 154(b) by 62 days.

(21) Appl. No.: 16/455,912

(22) Filed: Jun. 28, 2019

(65) Prior Publication Data
US 2020/0013200 A1 Jan. 9, 2020

(30) Foreign Application Priority Data
Jul. 4, 2018 (JP) .............................. JP2018-127918

(51) Int. Cl.
G06T 11/00 (2006.01)
G06T 3/40 (2006.01)

(52) U.S. Cl.
CPC .......... *G06T 11/006* (2013.01); *G06T 3/4023* (2013.01); *G06T 2211/421* (2013.01)

(58) Field of Classification Search
None
See application file for complete search history.

(56) References Cited

U.S. PATENT DOCUMENTS

| 6,510,241 B1* | 1/2003 | Vaillant .................. A61B 6/583 |
| | | 345/419 |
| 2004/0030255 A1* | 2/2004 | Alfano ............... G01N 21/4795 |
| | | 600/476 |

(Continued)

FOREIGN PATENT DOCUMENTS

| JP | 2002-071345 A | 3/2002 |
| JP | 2004-012407 A | 1/2004 |

OTHER PUBLICATIONS

U.S. Appl. No. 16/455,883 to Yutaka Ohtake et al., which was filed Jun. 28, 2019.

*Primary Examiner* — Kevin Ky
(74) *Attorney, Agent, or Firm* — Greenblum & Bernstein, P.L.C.

(57) ABSTRACT

Projection images of reduced resolution are generated by reducing resolution of filtered projection images and/or reducing the number of filtered projection images. Volume data of reduced resolution is generated by performing CT reconstruction using the projection images of reduced resolution. Each voxel of the volume data of reduced resolution is provisionally divided. The provisionally divided voxels are compared in voxel value before and after provisional division. If a difference in voxel value before and after the provisional division is greater than a threshold, the provisional division is determined to be valid, and division is further continued. If the difference in voxel value before and after the provisional division is less than or equal to the threshold, the provisional division is determined to be invalid and the voxel ends being divided.

8 Claims, 5 Drawing Sheets

(56) References Cited

U.S. PATENT DOCUMENTS

| | | | |
|---|---|---|---|
| 2010/0054567 A1* | 3/2010 | Hillebrand | G06T 11/006 |
| | | | 382/131 |
| 2011/0097007 A1* | 4/2011 | Zeng | A61B 6/5258 |
| | | | 382/260 |
| 2011/0229007 A1* | 9/2011 | Jerebko | A61B 6/025 |
| | | | 382/132 |
| 2012/0106820 A1* | 5/2012 | Rousso | G06T 11/006 |
| | | | 382/132 |
| 2019/0223826 A1 | 7/2019 | Asano et al. | |
| 2019/0227004 A1 | 7/2019 | Ariga et al. | |
| 2019/0251736 A1* | 8/2019 | Iizuka | G06T 11/008 |
| 2020/0066009 A1* | 2/2020 | Dwivedi | G06T 11/006 |

* cited by examiner

128³ VOXELS    EQUIVALENT TO 256³ VOXELS    EQUIVALENT TO 2048³ VOXELS

CT RECONSTRUCTION METHOD USING FILTERED BACK PROJECTION

CROSS-REFERENCE TO RELATED APPLICATION

The disclosure of Japanese Patent Application No. 2018-127916 filed on Jul. 4, 2018 including specifications, drawings and claims is incorporated herein by reference in its entirety.

TECHNICAL FIELD

The present invention relates to a CT reconstruction method using filtered back projection, and more particularly to a CT reconstruction method using filtered back projection by which CT reconstruction processing can be significantly accelerated.

BACKGROUND ART

Medical X-ray CT apparatuses were put to practical use in the 1970s. Based on such techniques, X-ray CT apparatuses intended for industrial products emerged in the early 1980s. Since then, industrial X-ray CT apparatuses have been used to observe and inspect castings for voids, welded parts for poor welding, and circuit patterns of electronic circuit parts for defects that are difficult to check for by appearances. As 3D printers are becoming prevalent in recent years, demands not only for observation and inspection inside articles produced by 3D printers but also for 3D dimension measurement of internal structures and higher precisions are on the increase.

With the foregoing technical trends, measurement X-ray CT apparatuses are becoming prevalent mainly in Germany (see Japanese Patent Application Laid-Open Nos. 2002-071345 and 2004-012407). Such a measurement X-ray CT apparatus performs X-ray irradiation while rotating an object to be measured placed on the center of a rotating table.

FIG. 1 shows a configuration of a typical X-ray CT apparatus 1 used for measurement. An enclosure 10 shielding x-rays accommodates an X-ray source 12, an X-ray detector 14, a rotating table 16, and an XYZ movement mechanism unit 18. The X-ray source 12 emits a cone beam of X-rays 13. The X-ray detector 14 detects the X-rays 13. An object to be measured (for example, work) W is placed on the rotating table 16, and the rotating table 16 rotates the work N for CT imaging. The XYZ movement mechanism unit 18 is intended to adjust the position and magnification of the work W projected on the X-ray detector 14. The X-ray CT apparatus 1 further includes a controller 20 that controls such devices, and a control PC 22 that gives instructions to the controller 20 on the basis of user operations.

Aside from the control of the devices, the control PC 22 has a function of displaying a projection image of the work W projected on the X-ray detector 14 and a function of reconstructing a tomographic image from a plurality of projection images of the work W.

As shown in FIG. 2, the X-rays 13 emitted from the X-ray source 12 are transmitted through the work W on the rotating table 16 and reach the X-ray detector 14. The work W is rotated to obtain transmission images (projection images) of the work W in all directions by the X-ray detector 14. Reconstruction using a CT reconstruction algorithm such as a back projection algorithm and an iterative reconstruction algorithm is performed to generate a tomographic image of the work W.

The position of the work W can be moved by controlling X-, Y-, and Z-axes of the XYZ movement mechanism 18 and a θ-axis of the rotating table 16. The imaging range (position and magnification) and the imaging angle of the work W can thereby be adjusted.

To obtain a tomographic image or volume data (stereoscopic image or a set of tomographic images in the Z-axis direction) of the work W, which is the ultimate goal of the X-ray CT apparatus 1, a CT scan is performed on the work W.

The CT scan includes two processes, namely, acquisition of projection images of the work W and CT reconstruction. In the projection image acquisition process, the rotating table 16 on which the work W is placed is rotated either continuously at a constant speed or intermittently with a constant step width during X-ray irradiation, whereby projection images of the work W are obtained in all circumferential directions (at regular intervals). The obtained projection images in all circumferential directions (at regular intervals) are subjected to CT reconstruction using a CT reconstruction algorithm such as a back projection algorithm and an iterative reconstruction algorithm. As illustrated in FIG. 3, a tomographic image or volume data of the work (in FIG. 3, master balls) is thereby obtained.

The obtained volume data can be used to perform various measurements such as dimension measurement and defect analysis.

SUMMARY OF INVENTION

Technical Problem

Various measurements (such as dimension measurement and defect analysis) inside a work can be performed by using generated volume data. The resolution of the volume data here is determined on the basis of needed measurement accuracy, and CT reconstruction conditions are determined to obtain the resolution. Volume data of higher resolution typically needs more time for CT reconstruction. Such a technique has had a problem of low time efficiency since the resolution is increased even in areas where the work shape or material does not change.

As a technique similar to that of the present invention, Kim et al., "Efficient Iterative CT Reconstruction on Octree Guided by Geometric Errors", iCT2016 describes an iterative CT reconstruction method in which the level of resolution is changed on the basis of the complexity of the work shape.

However, combinations with iterative CT reconstruction processing have not been successful in providing a sufficient effect.

The present invention has been made in order to solve the above-described problems in the conventional technique, and an object thereof is to significantly accelerate the CT reconstruction processing.

Solution to Problem

The present invention solves the foregoing problems by the provision of a CT reconstruction method using filtered back projection, including, in performing CT reconstruction processing by applying filtered back projection to transmission images of an object to be measured obtained by using an X-ray CT apparatus: applying a filter for filtered back projection processing to the transmission images to generate filtered projection images; generating projection images of reduced resolution by reducing resolution of the filtered projection images and/or reducing the number of filtered projection images; generating volume data of reduced resolution by performing CT reconstruction using the projection images of reduced resolution; provisionally dividing each voxel of the volume data of reduced resolution; comparing the provisionally divided voxels in voxel value before and after provisional division; if a difference in voxel value before and after the provisional division is greater than a threshold, determining the provisional division to be valid, reflecting the provisionally divided voxels on the voxel of the volume data, and further continuing division; and if the difference in voxel value before and after the provisional division is less than or equal to the threshold, determining the provisional division to be invalid and ending dividing the voxel.

Here, a level of resolution can be changed on the basis of complexity of shape of the object to be measured.

An edge portion of the object to be measured can be more finely divided, and another portion without much change in shape can be less finely divided.

Projection images of respective resolutions can be stored.

An octant level can be provided to identify the number of times of division.

The resolution of the filtered projection images can be reduced by 2×2 binning in which pixels are combined in twos in two directions to reduce the number of pixels to a quarter.

The number of filtered projection images can be reduced on an every-other-image basis.

A voxel can be provisionally divided in two in each of three directions, i.e., into 2×2×2=8 voxels.

Advantageous Effects of Invention

According to the present invention, CT reconstruction processing can be significantly accelerated by changing the level of resolution on the basis of the complexity of shape of a work.

These and other novel features and advantages of the present invention will become apparent from the following detailed description of preferred embodiments.

BRIEF DESCRIPTION OF DRAWINGS

The preferred embodiments will be described with reference to the drawings, wherein like elements have been denoted throughout the figures with like reference numerals, and wherein.

DESCRIPTION OF EMBODIMENTS

An embodiment of the present invention will be described in detail below with reference to the drawings. It should be noted that the present invention is not limited to the description of the following embodiment or examples. Constituent features of the embodiment and examples described below include what are readily conceivable by those skilled in the art, what are substantially identical, and what are in the so-called range of equivalency. The components disclosed in the following embodiment and examples may be combined as appropriate or selected and used as appropriate.

Figure 4:
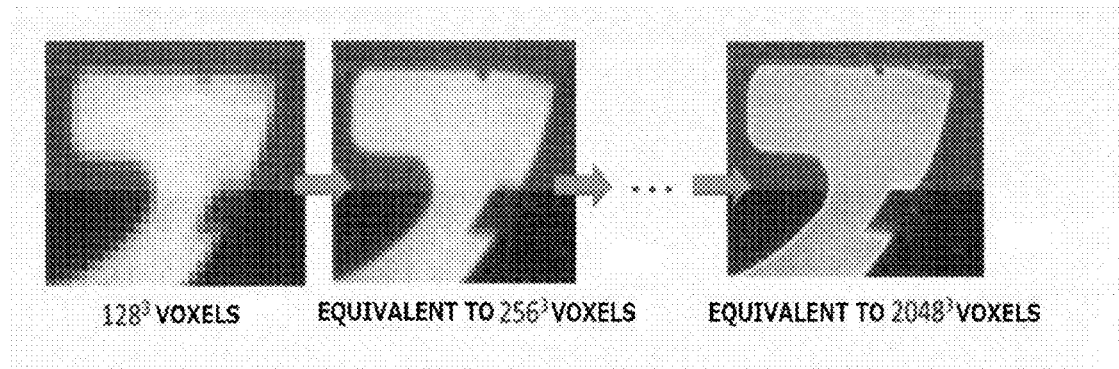
FIG. 4 is a diagram for describing a principle of the present invention.

FIG. 4 shows a principle of the present invention. As shown in FIG. 4, CT reconstruct-on processing using filtered back projection includes initially performing CT reconstruction on projection images of reduced resolution. Each voxel of the generated volume data of reduced resolution is then divided as needed.

FIG. 4 shows a state in which volume data (voxels) having a resolution of $128^3$ voxels is locally divided up to a resolution of $2048^3$ voxels. Edge portions of an object to be measured are more divided, and other portions without much change in shape are hardly divided.

As employed herein, division refers to performing local CT reconstruction at higher resolution. For example, a voxel can be divided in two in each of x, y, and z, three directions i.e., into 2×2×2=8 voxels.

To determine whether a voxel needs to be divided, a change in voxel value before and after division is checked. A large change in voxel value before and after division indicates that the shape of the object to be measured fails to be properly sampled at the resolution before the division. In such a case, the division is determined to be needed. On the other hand, if a change in voxel value before and after division is small, higher resolution is not needed and the division is determined to not be needed.

A specific embodiment of the present invention will be described below.

Figure 1:
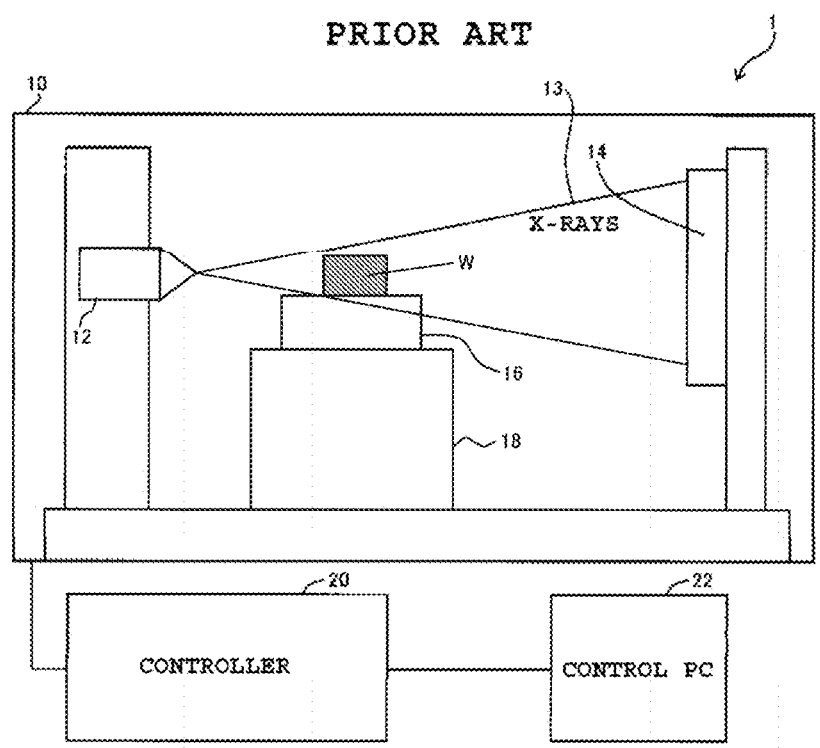
FIG. 1 is a sectional view showing an overall configuration of a typical X-ray CT apparatus used for measurement.
Figure 2:
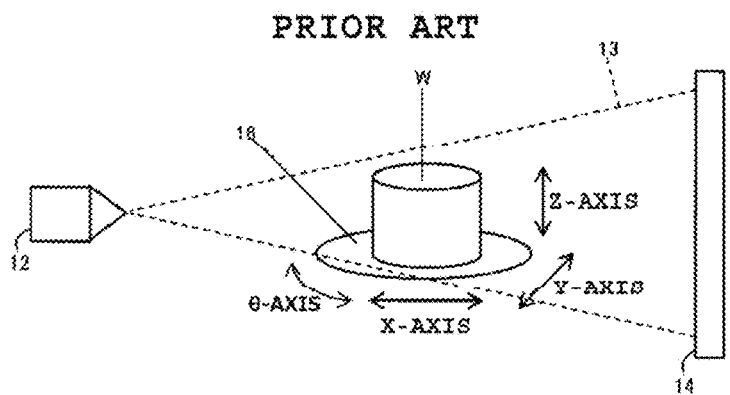
FIG. 2 is a perspective view showing an arrangement of essential parts of the same.
Figure 3:
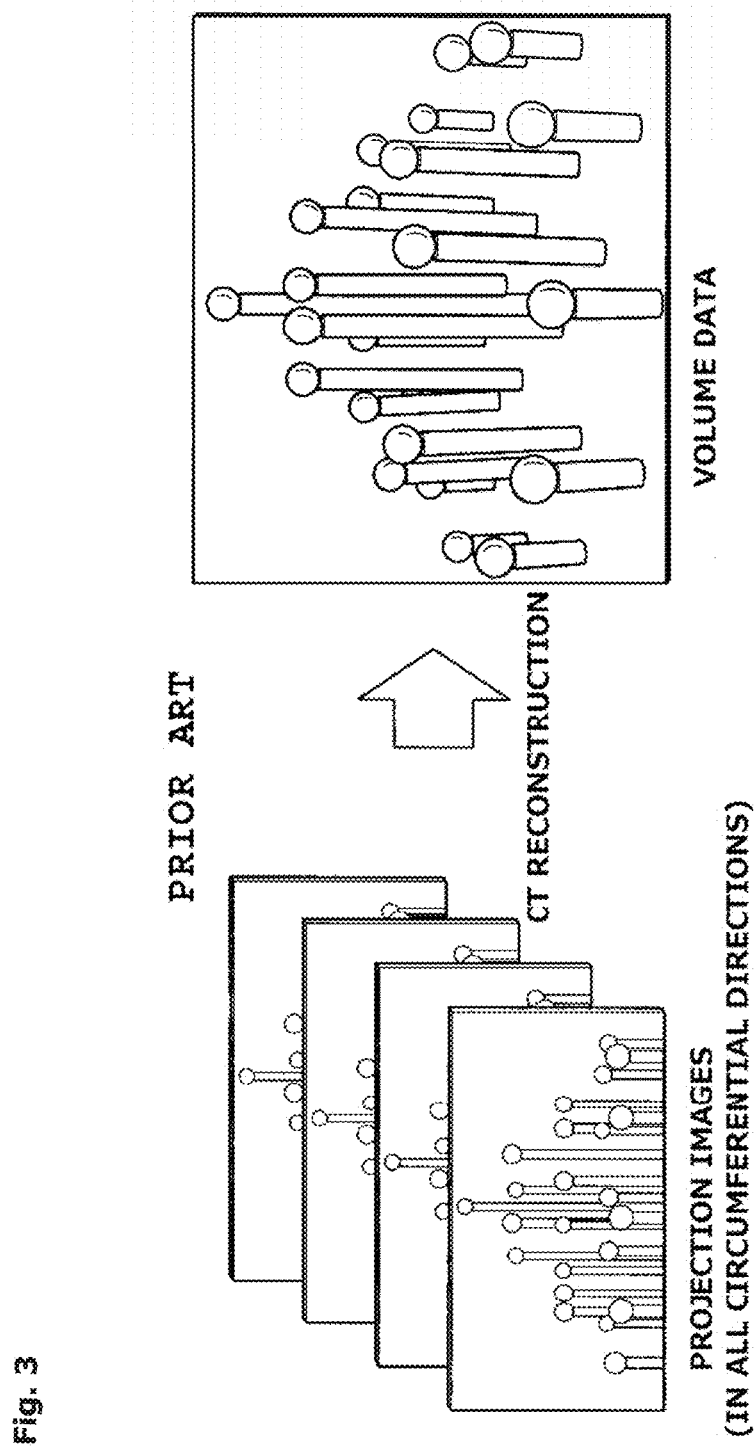
FIG. 3 is a diagram showing an outline of CT reconstruction by the same.
Figure 5:
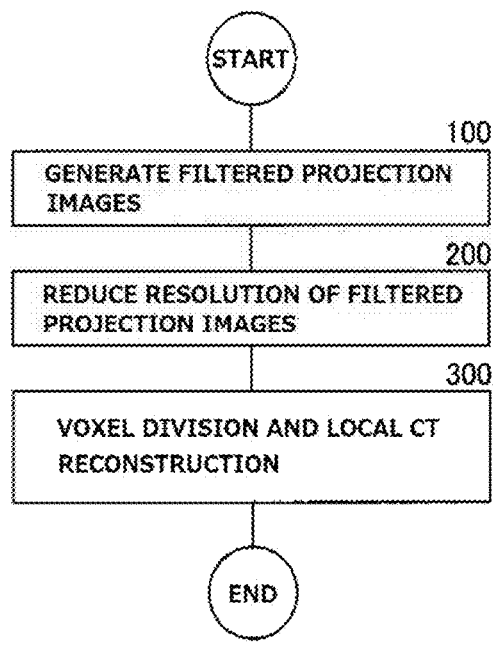
FIG. 5 is a flowchart showing a processing procedure according to an embodiment of the present invention.

In the present embodiment, in step 100 of FIG. 5, filtered projection images are initially generated. Specifically, transmission images of a work W are obtained by using an X-ray CT apparatus 1 such as shown in FIG. 1. The transmission images are then logarithmically converted, and a filter for filtered back projection processing are applied to the resulting projection images.

Figure 6:
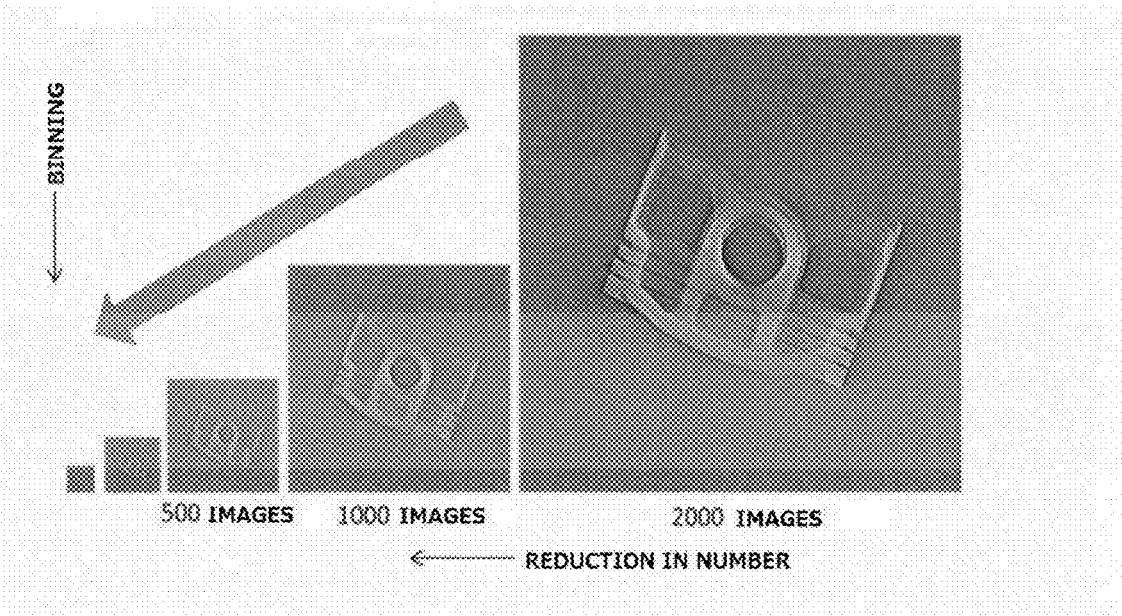
FIG. 6 is a diagram showing a state in which filtered projection images are reduced in resolution according to the embodiment.

In step 200, the filter-applied projection images (filtered projection images) are reduced in resolution. Specifically, as illustrated in FIG. 6, the resolution of the filtered projection images and the number of filtered projection images are reduced. The resolution of the images is reduced, for example, by repeating 2×2 binning in which pixels are combined in twos in x and y, two directions to reduce the number of pixels to a quarter. The number of images is reduced, for example, by repeating leaving odd-numbered images. Projection images of respective resolutions are stored for use in subsequent voxel division. Such projection images can be written to temporary files to save memory space.

The processing proceeds to step 300. In step 300, voxel division and local CT reconstruction are performed. Specifically, CT reconstruction is performed by using the projection images of the lowest resolution generated in step 200, whereby low-resolution volume data is generated. Each voxel of the volume data is then divided as needed, for example, in two in each of the x, y, and z, three directions, i.e., into 2×2×2=8 voxels. Octant levels (OLV) for identifying the number of times of division are provided for the sake of convenience. A voxel of volume data in a state of never having been divided has OLV0. A voxel in a state of being divided for the ith time is then given OLVi. A voxel is divided by generating voxels by CT reconstruction on projection images of the immediately higher resolution.

Figure 7:
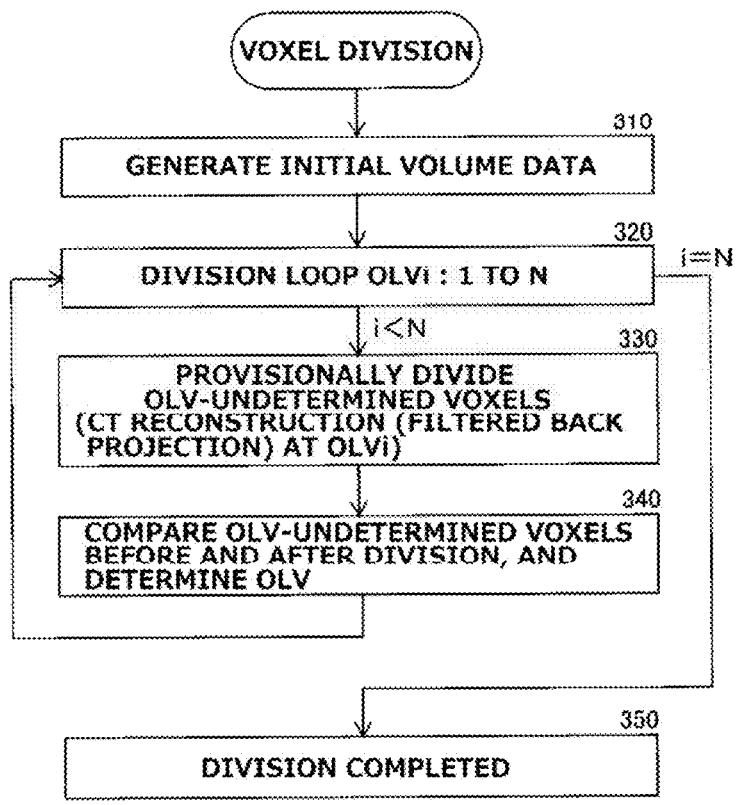
FIG. 7 is a flowchart showing a procedure of voxel division according to the embodiment.
Figure 8:
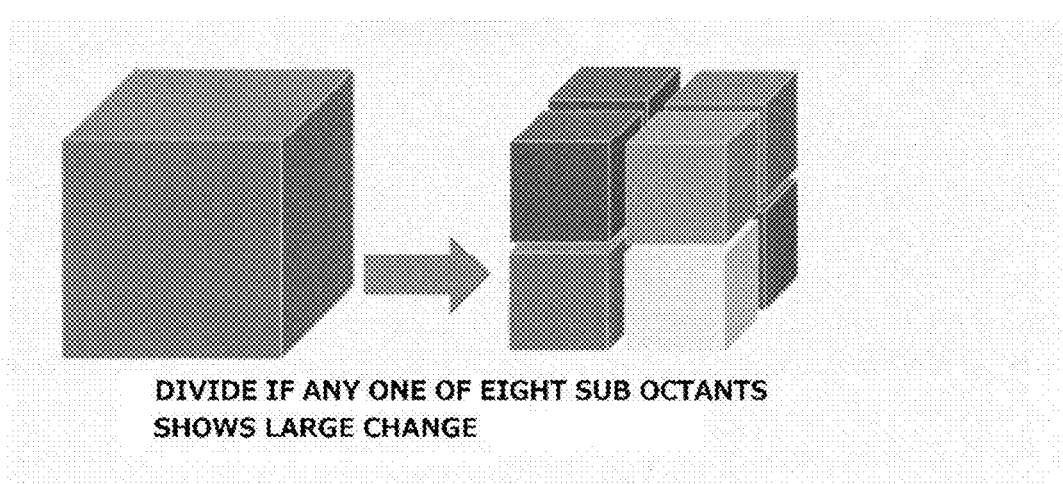
FIG. 8 is a perspective view showing a state of division according to the embodiment.

FIG. 7 shows a procedure of voxel division.

For voxel division, initial volume data is initially generated in step 310. Specifically, volume data is generated by performing CT reconstruction processing using filtered back projection on the projection images of the lowest resolution generated in step 200 of FIG. 5. All the voxels in this volume data are provisionally given OLV0.

The processing then proceeds to step 320. In step 320, whether division loops up to, for example, a maximum resolution N have all been ended is determined. If the number of times of loop i≤N and the determination is NO, the processing proceeds to step 330. In step 330, voxels whose OVLs are still undetermined (provisionally set) at OVLi are provisionally divided. Specifically, for example, if i=1 (OVL1), the volume data in this step is in the state of never having been divided. Since all the voxels are in the OLV-undetermined state, the voxels are all provisionally divided. This provisional division is performed by generating voxels by CT reconstruction processing on the projection images of the immediately higher resolution.

The processing proceeds to step 340. In step 340, the OLV-undetermined voxels provisionally divided in step 330 are checked for a change in voxel value before and after the division. Specifically, differences between the voxel values of the respective provisionally-divided eight voxels and that of the voxel before the division are calculated. If a maximum value of the differences is greater than a threshold, the provisional division is determined to valid. On the other hand if the maximum value is less than or equal to the threshold, the provisional division is determined to be invalid, and the OLV of the voxel at that time is determined (fixed).

If the provisional division is valid, the provisionally divided voxels are reflected on the voxel of the volume data, and provisional division is continued.

In step 320, if the resolution of the divided voxels has reached the maximum resolution i=N and the division loops are determined to have ended, then in step 350, the division is completed.

CT reconstruction is not needed after the completion of the division, since local CT reconstruction has been performed during provisional division and the results have been reflected if the provisional division is valid.

In such a manner, the CT reconstruction processing using filtered back projection can be significantly accelerated by changing the level of resolution on the basis of the complexity of the shape of object to be measured.

In the foregoing embodiment, the resolution of the images is reduced by 2×2 binning, the number of images is reduced on an every-other-image basis, and voxels are provisionally divided into 2×2×2=8 voxels each. However, the reduction in resolution, the reduction in the number of images, and the number of provisionally divided voxels are not limited thereto.

The number of division loops is not limited to N at which the resolution reaches the maximum, either. For example, the division may be ended before the maximum resolution is reached.

Voxels may be divided beyond the resolution of the original projection images. In such a case, the division is performed by using the same projection images and the same number of images as when the voxels are divided at the maximum resolution. The volume data may have resolution higher than that of the projection images. For example, 4096×4096×4096 voxels of volume data may be generated from 2048×2048-pixel projection images. Even in such a case, high-precision volume data can be obtained by the filtered back projection algorithm if there are a sufficient number of projection images.

While in the foregoing embodiment of the present invention is applied to the measurement of a work, the object to be measured is not limited to a work.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

The invention claimed is:

1. A CT reconstruction method using filtered back projection, comprising, in performing CT reconstruction processing by applying filtered back projection to transmission images of an object to be measured obtained by using an X-ray CT apparatus:
    applying a filter for filtered back projection processing to the transmission images to generate filtered projection images;
    generating projection images of reduced resolution by reducing resolution of the filtered projection images and/or reducing a number of the filtered projection images;
    generating volume data of reduced resolution by performing CT reconstruction using the projection images of reduced resolution;
    provisionally dividing each voxel of the volume data of reduced resolution;
    comparing the provisionally divided voxels in voxel value before and after provisional division;
    if a difference in the voxel value before and after the provisional division is greater than a threshold, determining the provisional division to be valid, reflecting the provisionally divided voxels on the voxel of the volume data, and further continuing division; and
    if the difference in the voxel value before and after the provisional division is less than or equal to the threshold, determining the provisional division to be invalid and ending dividing the voxel.

2. The CT reconstruction method using filtered back projection according to claim 1, wherein a level of resolution is changed on a basis of complexity of shape of the object to be measured.

3. The CT reconstruction method using filtered back projection according to claim 2, wherein an edge portion of the object to be measured is more finely divided, and another portion without much change in shape is less finely divided.

4. The CT reconstruction method using filtered back projection according to claim 1, wherein projection images of respective resolutions are stored.

5. The CT reconstruction method using filtered back projection according to claim 1, wherein an octant level is provided to identify a number of times of the division.

6. The CT reconstruction method using filtered back projection according to claim 1, wherein the resolution of the filtered projection images is reduced by 2×2 binning in which pixels are combined in twos in two directions to reduce a number of the pixels to a quarter.

7. The CT reconstruction method using filtered back projection according to claim 1, wherein a number of the filtered projection images is reduced on an every-other-image basis.

8. The CT reconstruction method using filtered back projection according to claim 1, wherein a voxel is provisionally divided in two in each of three directions, into 2×2×2=8 voxels.

* * * * *